W. H. FULTON.
PIPE COUPLING.
APPLICATION FILED FEB. 20, 1918.
1,329,759.
Patented Feb. 3, 1920.
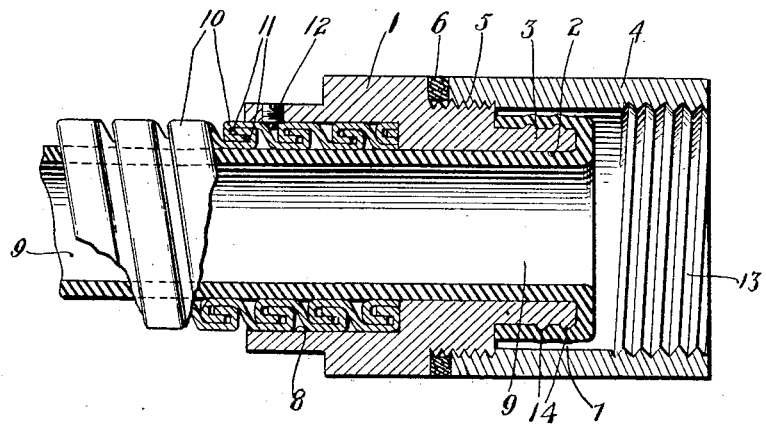
William H. Fulton INVENTOR
BY
Thomas Howe ATTORNEY

UNITED STATES PATENT OFFICE.

WILLIAM H. FULTON, OF IRVINGTON, NEW JERSEY, ASSIGNOR TO TITEFLEX METAL HOSE CORPORATION, A CORPORATION OF NEW YORK.

PIPE-COUPLING.

1,329,759.     Specification of Letters Patent.     Patented Feb. 3, 1920.

Application filed February 20, 1918. Serial No. 218,207.

*To all whom it may concern:*

Be it known that I, WILLIAM H. FULTON, a citizen of the United States, residing at Irvington, county of Union, State of New Jersey, have invented new and useful Improvements in Pipe-Couplings, of which the following is a specification.

This invention relates to an improved fitting embodying improved means whereby the end of a flexible hose may be secured to a union whereby the pipe may be attached to a terminal fitting or to another length of pipe either flexible or stiff.

According to the present invention, the pressure of the fluid in the pipe is availed of to secure the hose to the fitting. Where extremely high pressures exist, ordinarily the tendency to disrupt the connection of the flexible hose to the fitting or cause leakage between them, is increased. According to the present invention, the pressure being utilized to secure the hose to the fitting, the higher the pressure of the fluid, the more firmly will the hose be secured to the fitting and the opposition to disruption or leakage increased accordingly.

Many flexible tubes, such as rubber, are well adapted for fluid conduits so far as fluid tightness is concerned, but such tubes often have small radial resistance so if a high pressure is placed within them, they are apt to expand or balloon laterally, if indeed they do not burst. By placing a strengthening tube which permits of bending, (such as a tube formed of a helically arranged strip with the edges of adjacent convolutions interlocked with clearances permitting the bending of the tube) about the weak but fluid tight tube, a conduit of suitable strength and tightness may be obtained.

It is a further object of the invention to provide an improved form of coupling which, while providing for the securing of the air tight flexible tube thereto, also is adapted to serve as a fitting for a tube armored as described.

Other and ancillary objects of the invention will appear hereinafter.

The accompanying drawing which illustrates the invention, is a longitudinal section of a fitting embodying the invention.

Referring to the drawing, the fitting comprises a body portion 1 having a fluid passage 2 and a tubular extension 3 which is surrounded by a sleeve 4 screw-threaded at 5 to the body 1. To avoid leakage a packing ring 6 may be inserted between the end of the sleeve 4 and the fitting body. Between the sleeve 4 and the extension 3 is formed a chamber 7 which is in communication with the fluid passage. At the end of the fitting opposite the extension 3 is formed an enlarged bore or socket 8 adapted to receive an armor for the flexible tube. The conduit as a whole comprises an inner flexible tube 9 of rubber which is passed through the fluid passage 2, the end of the tube having its walls turned outwardly from the center about the end of the extension and back upon the exterior surface thereof. Surrounding the tube 9 is a strengthening tube or armor 10 formed from a helically disposed strip of metal having the edges of adjacent convolutions interlocked, there being clearances as 11 in the joints to permit flexing of the armor. The end of this protecting tube or armor 10 is entered within the socket 8 of the fitting and may be secured thereto by a number of set screws as 12 of which a number may be distributed about the fitting, or the armor may be soldered to the fitting or secured in other ways. The sleeve 4 at its outer end may be provided with screw thread 13, whereby it may be united to another pipe, or a plug might be screwed into the end of the sleeve to close the end of the conduit.

The parts having been assembled as indicated, the fluid pressure which will be exerted upon the bent over end of the flexible tube 9 will press the end closely against the fitting, supplementing the elasticity of the hose. The higher the fluid pressure the stronger will be this pressure so that the higher the pressure the less danger of leakage. It will further be observed that the end of the flexible tube is snubbed, so to speak, about the end of the extension over which it is bent, so that it has a strong resistance to a longitudinal pull tending to draw the tube out of the fitting and the security of the fastening may be enhanced by ridges 14 on the outer surface of the tubular extension 3. Moreover the structure is protected against rupture by longitudinal pull (as well as against radial expansion) by the strength of the armor 10, which, being secured at its ends to the fittings at the ends of the hose, opposes its strength to any longitudinal pull upon the hose. It will be observed that the outer circumferential surface of the bent over portion of the flexible tube is of greater area than its inner circumferential surface. Accordingly for a given pressure per square inch, the pressure on the outer surface will be greater than that on the inner. Consequently the pressure on the outer surface will overbalance any tendency of the fluid to force itself under the end of the flexible tube and cause leakage; and the greater the pressure the greater the overbalancing.

While the invention has been illustrated in what is considered its best application, it may have other embodiments without departing from its spirit, and is not therefore limited to the structure shown in the drawing.

What I claim is—

1. The combination with a fitting having a fluid passage, of a flexible tube extending through said passage, said fitting having a shoulder about which the walls of said tube are bent outwardly from its center, and a surface against which the bent over portion of the tube is forced by the fluid pressure of the passage.

2. The combination with a fitting having a fluid passage, a tubular extension about said passage, and a sleeve surrounding said extension and spaced therefrom to form a chamber communicating with said passage, of a flexible tube extending through said passage and having its end bent about the end of said extension and back upon the exterior surface thereof, said chamber providing a clearance outside the bent back portion of the tube and in communication with the said fluid passage.

3. The combination with a fitting having a fluid passage, a tubular extension surrounding said passage and a sleeve screw-threaded to the remainder of the fitting, said sleeve surrounding said extension and spaced therefrom to form a chamber communicating with said passage, of a tube extending through said passage and having its end bent about the end of said extension and back upon the exterior surface thereof, said chamber providing a clearance outside the bent back portion of the tube and in communication with the said fluid passage.

4. The combination with a fitting having at one end means for attaching a tube armor, a passage extending through said fitting, a tubular extension surrounding said passage and a sleeve screw-threaded to the remainder of the fitting, said sleeve surrounding said extension and spaced therefrom to form a chamber in communication with said passage, of a flexible tube extending through said passage and having its end bent about the end of said extension and back upon the exterior surface thereof, said chamber providing a clearance outside the bent back portion of the tube and in communication with the said fluid passage.

5. The combination with a fitting having a fluid passage, of a flexible tube extending through said passage, an armor surrounding said flexible tube and means for securing said armor to said fitting, said fitting having a tubular extension and a sleeve surrounding said extension and spaced therefrom to form a chamber communicating with said passage, said tube having its walls at its end bent about the end of said extension and back upon the exterior surface thereof, said chamber providing a clearance outside the bent back portion of the tube and in communication with the said fluid passage.

6. The combination with a fitting having a fluid passage, of a flexible tube extending through said passage, an armor surrounding said flexible tube and said fitting having a tubular socket for receiving the armor for the tube, the opposite end of said fitting being provided with a tubular extension and a sleeve surrounding said extension and spaced therefrom to form a chamber communicating with said passage, said tube having its walls at its end bent about the end of said extension and back upon the exterior surface thereof, said chamber providing a clearance outside the bent back portion of the tube and in communication with the said fluid passage.

7. The combination with a fitting having a fluid passage, of a flexible tube non-positively secured to said fitting and an armor about said tube and secured to said fitting.

8. The combination with a fitting having a fluid passage, of a flexible tube extending through said passage, said fitting having a shoulder about which the walls of said tube are bent outwardly from its center and a surface against which the bent over portion of the tube is forced by the fluid pressure of the passage, an armor surrounding said flexible tube and means for securing said armor to said fitting.

9. The combination with a fitting having a fluid passage, of a flexible tube extending through said passage, and a flexible band, said fitting having a shoulder against which said band is forced by the fluid pressure of the passage, said band being connected in a fluid tight relation with said flexible tube.

10. The combination with a fitting having a fluid passage, a tubular extension about said passage, and a sleeve surrounding said extension and spaced therefrom to form a chamber communicating with said passage, of a flexible tube extending through said passage and a flexible band surrounding said extension connected with fluid tight relation with said flexible tube, said chamber providing a clearance outside said band and in communication with the fluid passage.

In testimony whereof I have signed this specification this 15th day of February, 1918.

WM. H. FULTON.